US012684161B2

(12) United States Patent
Sim et al.

(10) Patent No.: US 12,684,161 B2
(45) Date of Patent: *Jul. 14, 2026

(54) METHOD AND APPARATUS FOR INTER-PREDICTION OF PICTURES WITH DIFFERENT RESOLUTIONS

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Jong Seok Lee, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 57 days.

This patent is subject to a terminal disclaimer.

(21) Appl. No.: 18/891,717

(22) Filed: Sep. 20, 2024

(65) Prior Publication Data

US 2025/0016364 A1      Jan. 9, 2025

Related U.S. Application Data

(63) Continuation of application No. 17/765,391, filed as application No. PCT/KR2020/013309 on Sep. 29, 2020, now Pat. No. 12,114,008.

(30) Foreign Application Priority Data

Sep. 30, 2019  (KR) ........................ 10-2019-0121031
Dec. 30, 2019  (KR) ........................ 10-2019-0177562
Sep. 28, 2020  (KR) ........................ 10-2020-0126206

(51) Int. Cl.
$H04N\ 7/12$          (2006.01)
$H04N\ 19/117$        (2014.01)
(Continued)

(52) U.S. Cl.
CPC ........... *H04N 19/53* (2014.11); *H04N 19/117* (2014.11); *H04N 19/139* (2014.11);
(Continued)

(58) Field of Classification Search
CPC .... H04N 19/53; H04N 19/117; H04N 19/139; H04N 19/176; H04N 19/196;
(Continued)

(56) References Cited

U.S. PATENT DOCUMENTS 9,578,328 B2    2/2017  Rapaka et al.
9,628,792 B2    4/2017  Rapaka et al.
(Continued)

FOREIGN PATENT DOCUMENTS

KR        20160032180 A      3/2016
KR        20160105861 A      9/2016

OTHER PUBLICATIONS

Office Action cited in corresponding Korean patent application 10-2020-0126206; Sep. 26, 2025; 9 pp.
(Continued)

*Primary Examiner* — Gims S Philippe
(74) *Attorney, Agent, or Firm* — Lempia Summerfield Katz LLC

(57)          ABSTRACT
Methods encode or decode a picture sequence, some having different resolutions, and store a bitstream of encoded video
(Continued)

data. A decoding method includes decoding a first syntax for specifying a reference size of pictures referring to a high-level syntax structure and decoding a second syntax element for specifying a picture size scaled from the reference size of the pictures referring to the high-level syntax structure. The method includes deriving at least one offset factor and at least one scale factor representing a scale difference between a current picture including a current block to be decoded and a reference picture referred to by the current block. The method includes generating a prediction block of the current block from the reference picture by using the motion vector of the current block, the at least one scale factor, and the at least one offset factor, reconstructing a residual block from the bitstream, and reconstructing the current block based on adding the prediction block and the residual block.

8 Claims, 10 Drawing Sheets

(51) Int. Cl.

| | |
|---|---|
| *H04N 19/139* | (2014.01) |
| *H04N 19/176* | (2014.01) |
| *H04N 19/196* | (2014.01) |
| *H04N 19/53* | (2014.01) |
| *H04N 19/70* | (2014.01) |

(52) U.S. Cl.
CPC ......... *H04N 19/176* (2014.11); *H04N 19/196* (2014.11); *H04N 19/70* (2014.11)

(58) Field of Classification Search
CPC ........ H04N 19/70; H04N 19/86; H04N 19/82; H04N 19/513; H04N 19/59; H04N 19/119
See application file for complete search history.

(56) References Cited

U.S. PATENT DOCUMENTS

| | | | | |
|---|---|---|---|---|
| 9,788,000 | B2 * | 10/2017 | Lim ..................... | H04N 19/159 |
| 9,819,947 | B2 | 11/2017 | Ye et al. | |
| 10,154,269 | B2 | 12/2018 | Ye et al. | |
| 10,375,416 | B1 | 8/2019 | Wenger et al. | |
| 10,404,987 | B2 * | 9/2019 | Samuelsson ......... | H04N 19/159 |
| 2014/0269939 | A1 | 9/2014 | Guo et al. | |
| 2015/0016520 | A1 | 1/2015 | Rapaka et al. | |
| 2015/0016540 | A1 | 1/2015 | Rapaka et al. | |
| 2015/0189298 | A1 | 7/2015 | Ye et al. | |
| 2015/0201204 | A1 | 7/2015 | Chen et al. | |
| 2015/0264373 | A1 * | 9/2015 | Wang ..................... | H04N 19/44 |
| | | | | 375/240.25 |
| 2015/0304667 | A1 * | 10/2015 | Suehring .............. | H04N 19/187 |
| | | | | 375/240.02 |
| 2018/0020225 | A1 | 1/2018 | Ye et al. | |
| 2018/0295385 | A1 | 10/2018 | Alshin et al. | |
| 2021/0227231 | A1 * | 7/2021 | Hannuksela ......... | H04N 19/176 |
| 2021/0281852 | A1 | 9/2021 | Alshina et al. | |
| 2021/0281858 | A1 | 9/2021 | Hannuksela | |
| 2022/0060706 | A1 | 2/2022 | Liu et al. | |
| 2022/0191543 | A1 | 6/2022 | He et al. | |
| 2023/0013085 | A1 | 1/2023 | Choi et al. | |

OTHER PUBLICATIONS

Office Action cited in the U.S. Appl. No. 18/891,707; Dec. 18, 2025; 7 pp.
Office Action cited in the U.S. Appl. No. 18/891,726; Jan. 28, 206; 12 pp.
Office Action cited in the U.S. Appl. No. 18/891,733; Jan. 30, 206; 25 pp.
International Search Report and Written Opinion cited in corresponding international app No. PCT/KR2020/013309; Jan. 21, 2021; 10 pp.
Jianle Chen et al., SHVC Test Model 2 (SHM 2), Document: JCTVC-M1007_v1; Joint Collaborative Team on Video Coding (JCT-VC) of ITU-T SG 16 WP 3 and ISO/IEC JTC1/SC29/WG11; Apr. 2013; 46 pp.

* cited by examiner

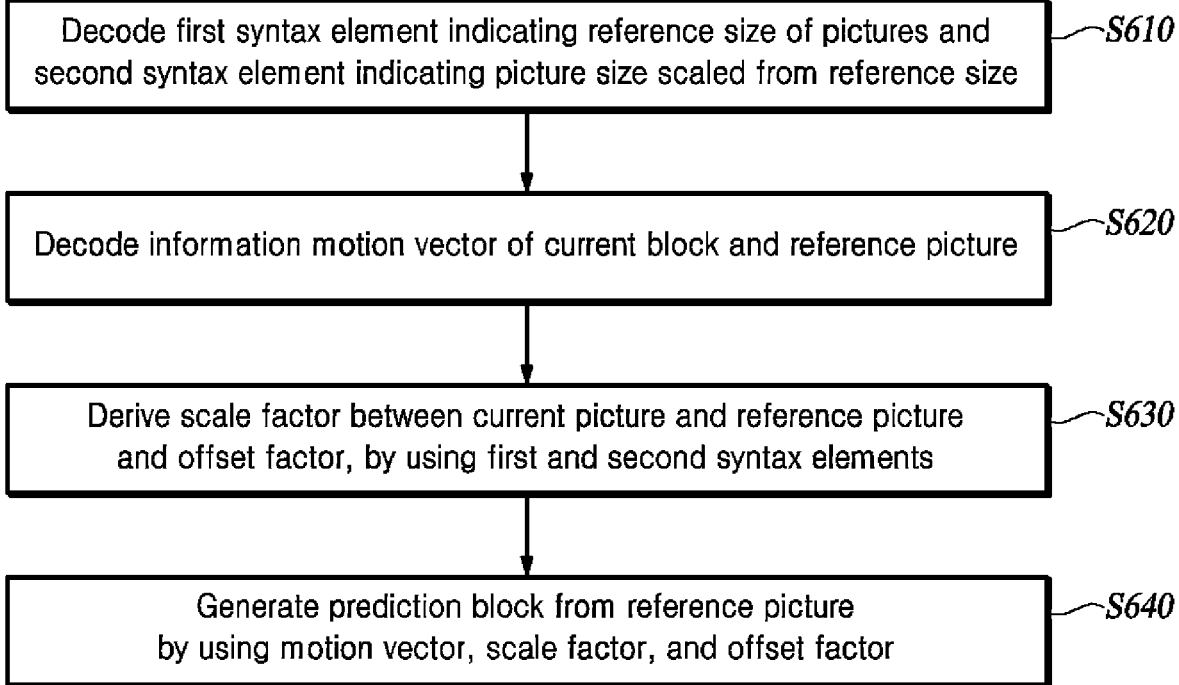

Decode first syntax element indicating reference size of pictures and second syntax element indicating picture size scaled from reference size ⟋ S610

Decode information motion vector of current block and reference picture ⟋ S620

Derive scale factor between current picture and reference picture and offset factor, by using first and second syntax elements ⟋ S630

Generate prediction block from reference picture by using motion vector, scale factor, and offset factor ⟋ S640

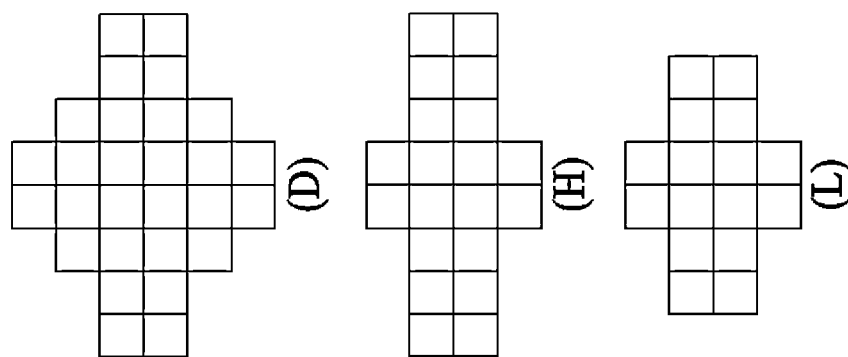
(D)     (H)     (L)
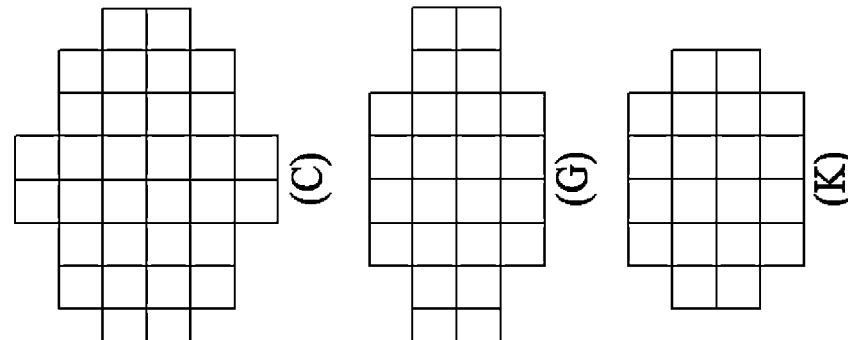
(C)     (G)     (K)
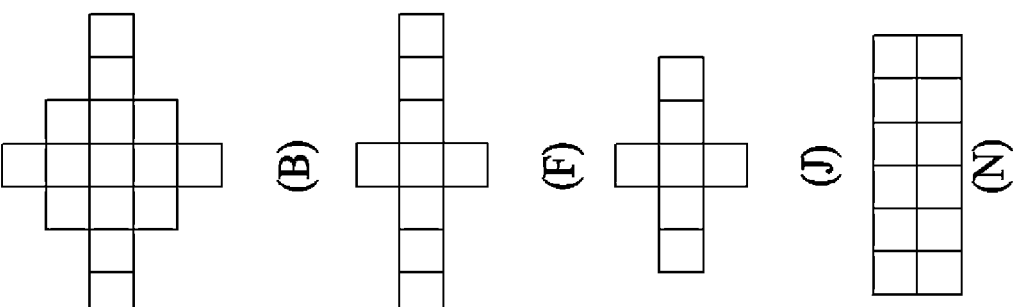
(B)     (F)     (J)     (N)
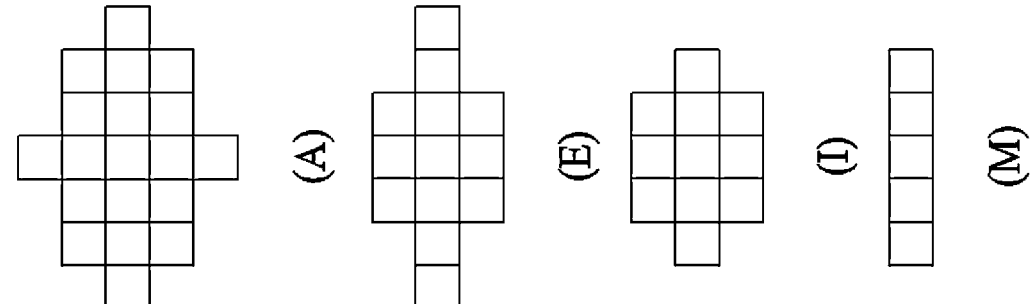
(A)     (E)     (I)     (M)
*FIG. 10*

(A)                              (B)

METHOD AND APPARATUS FOR INTER-PREDICTION OF PICTURES WITH DIFFERENT RESOLUTIONS

CROSS-REFERENCE TO RELATED APPLICATION

This application is a continuation of non-provisional U.S. patent application Ser. No. 17/765,391 filed Mar. 30, 2022 and entitled "METHOD AND APPARATUS FOR INTER-PREDICTION OF PICTURES WITH DIFFERENT RESO-LUTIONS", which is a U.S. national stage of International Application No. PCT/KR2020/013309, filed on Sep. 29, 2020, which claims priority to Korean Patent Application No. 10-2019-0121031, filed on Sep. 30, 2019, Korean Patent Application No. 10-2019-0177562, filed on Dec. 30, 2019, and Korean Patent Application No. 10-2020-0126206, filed on Sep. 28, 2020. The entire contents of these applications are incorporated herein by reference.

TECHNICAL FIELD

The present disclosure relates to a method and an apparatus for encoding and decoding of video, and more particularly, to a method and an apparatus for inter-prediction that considers differences in resolution between pictures.

BACKGROUND

Since the volume of video data is greater than that of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/AVC and High Efficiency Video Coding (HEVC), which improves coding efficiency over H.264/AVC by about 40%.

However, the picture size, resolution, and frame rate are gradually increasing, and thus the amount of data to be encoded is also increasing. Accordingly, a new compression technique having better encoding efficiency and higher image quality than the existing compression technique is required.

In video encoding, predictive encoding is mainly used to improve compression performance. Prediction includes intra-prediction for predicting a target block to be encoded based on pre-reconstructed samples in a current picture and includes inter-prediction for predicting a current block using a pre-reconstructed reference picture. In particular, the inter-prediction is widely used for video encoding because it exhibits superior compression performance compared to intra-prediction. However, if there are differences in reso-lution between the current picture and the reference picture that the target block refers to, the existing inter-prediction method may significantly decrease encoding efficiency.

Accordingly, in the case of encoding or decoding of a video sequence of pictures some of which have different resolutions, a method for solving problems caused by the differences in resolution is required.

SUMMARY

The present disclosure relates to a method and an apparatus for encoding or decoding of a video sequence of pictures some of which have different resolutions. The present disclosure proposes a method for inter-prediction that considers differences in resolution between a current picture and a reference picture.

In accordance with one aspect of the present disclosure, a method is provided for decoding a sequence of pictures, some of which have different resolutions. The method includes: decoding, from a high-level syntax structure of the sequence, a first syntax element for specifying a reference size of pictures referring to the high-level syntax structure and a second syntax element for specifying a picture size scaled from the reference size of the pictures referring to the high-level syntax structure. The method also includes deriv-ing at least one offset factor and at least one scale factor representing a scale difference between a current picture including a current block to be decoded and a reference picture referred to by the current block. The at least one scale factor and the at least one offset factor are used to modify a sample position indicated by a motion vector of the current block within the reference picture. The method also includes generating a prediction block of the current block from the reference picture, by using the motion vector of the current block, the at least one scale factor, and the at least one offset factor.

In accordance with another aspect of the present disclo-sure, a video decoding apparatus is provided for decoding a sequence of pictures, some of which have different resolu-tions. The apparatus comprises a decoder and a predictor. The decoder is configured to decode, from a high-level syntax structure of the sequence, a first syntax element for specifying a reference size of pictures referring to the high-level syntax structure and a second syntax element for specifying a picture size scaled from the reference size of the picture referring to the high-level syntax structure. The decoder is also configured to decode information represent-ing a motion vector and a reference picture of a current block to be decoded. The predictor is configured to derive at least one offset factor and at least one scale factor indicating a scale difference between a current picture including the current block and the reference picture. The predictor is also configured to generate a prediction block of the current block from the reference picture, by using the motion vector of the current block, the at least one scale factor, and the at least one offset factor. Herein, the at least one scale factor and the at least one offset factor are used to modify a sample position indicated by a motion vector of the current block within the reference picture.

BRIEF DESCRIPTION OF THE DRAWINGS

FIG. 6 is a sequential chart showing a method of decoding an encoded video sequence of pictures, some of which have different resolutions or sizes.

FIGS. 9 and 10 are various examples of Wiener filters.

DETAILED DESCRIPTION

Figure 1:
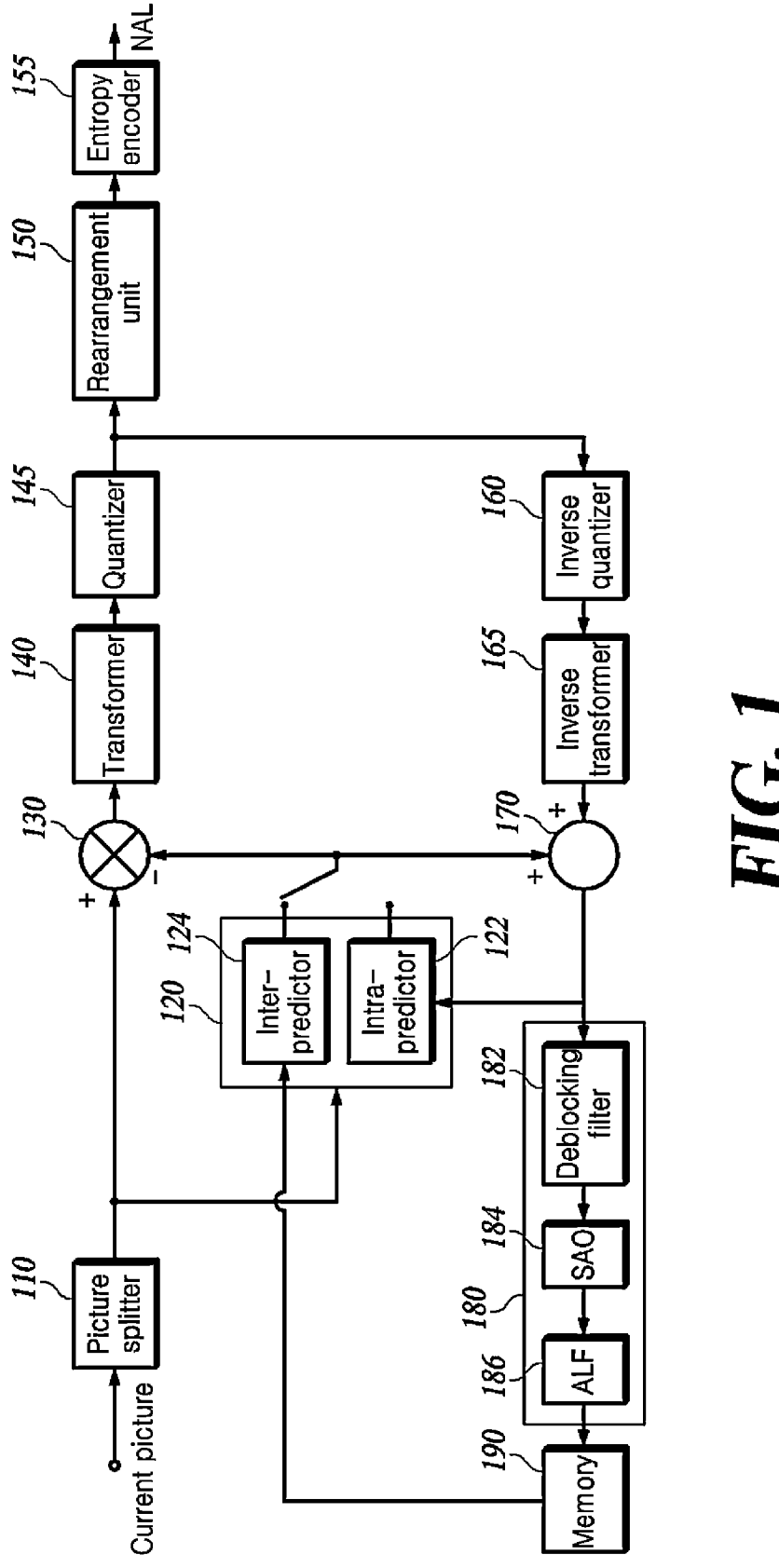
FIG. 1 is a block diagram of a video encoding apparatus capable of implementing the techniques of the present disclosure.

Hereinafter, some embodiments of the present disclosure are described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein has been omitted to avoid obscuring the subject matter of the present disclosure.

FIG. 1 is a block diagram of a video encoding apparatus capable of implementing the techniques of the present disclosure. Hereinafter, a video encoding apparatus and elements of the apparatus are described with reference to FIG. 1.

The video encoding apparatus includes a block splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190. Each element of the video encoding apparatus may be implemented in hardware, software, or a combination of hardware and software. The functions of the respective elements may be implemented as software, and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. In particular, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU.

In addition, information applied to all blocks in one slice in common is encoded as a syntax of a slice header, and information applied to all blocks constituting one or more pictures is encoded in a picture parameter set (PPS) or a picture header. Furthermore, information, which a sequence composed of a plurality of pictures refers to in common, is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

Additionally, a bitstream may include one or more adaptation parameter sets (APS) including parameters referred to by a picture or a pixel group smaller than the picture, for example, a slice. A picture header or a slice header includes an ID for identifying an APS to be used in a corresponding picture or slice. Pictures referring to different PPSs or slices referring to different picture headers may share the same parameters through the same APS ID.

Each of a plurality of pictures may be partitioned into a plurality of subpictures that can be independently encoded/decoded and/or independently displayed. If subpicture partitioning applies, information on the layout of subpictures within a picture is signaled.

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting the video into a plurality of CTUs having a predetermined size and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size. The tree structure may be a Binary Tree (BT), in which a node is split into two sub-nodes. The tree structure may be a TernaryTree (TT), in which a node is split into three sub-nodes at a ratio of 1:2:1. The tree structure may be a structure formed by a combination of two or more of the QT structure, the BT structure, and the TT structure. For example, a QuadTree plus Binary Tree (QTBT) structure may be used, or a QuadTree plus Binary Tree Ternary Tree (QTBTTT) structure may be used. Here, BTTT may be collectively referred to as a multiple-type tree (MTT).

Figure 2:
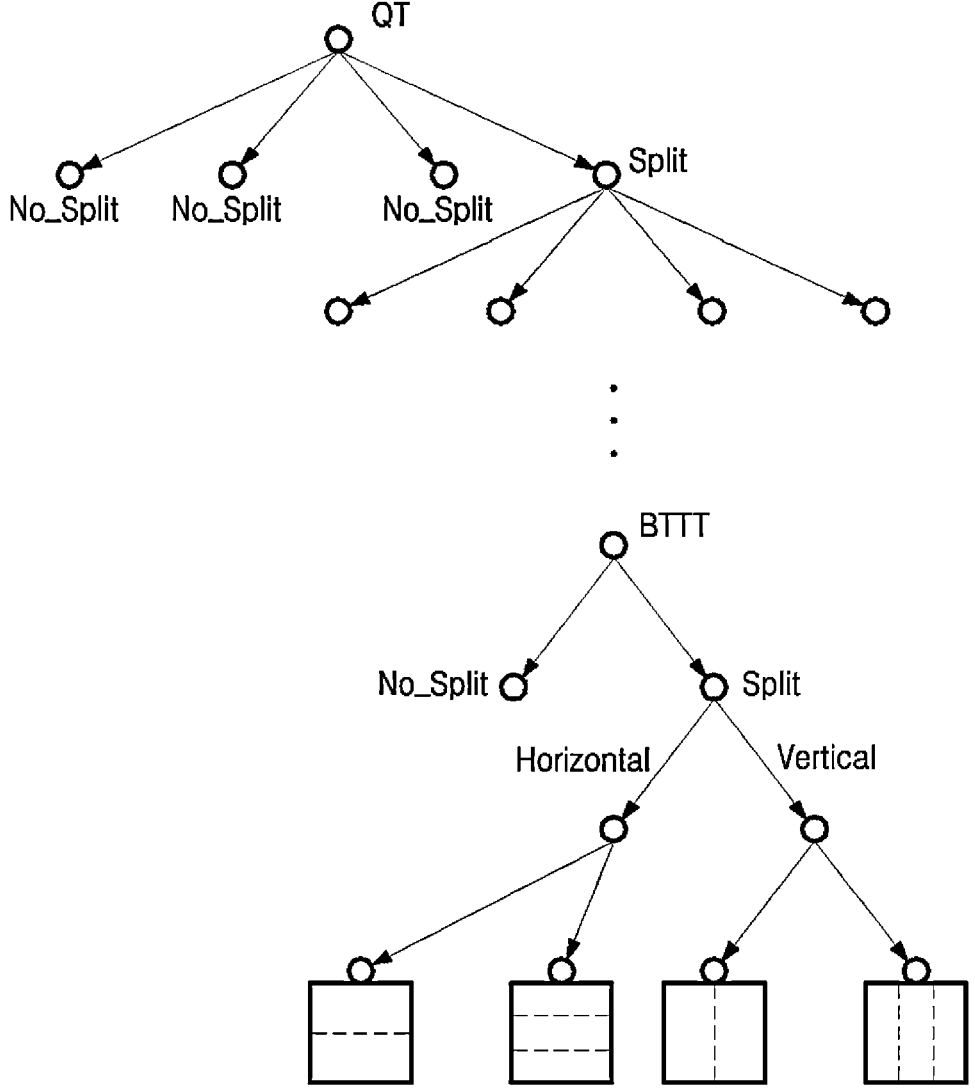
FIG. 2 shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types including a type of horizontally splitting a block into two blocks of the same size (i.e., symmetric horizontal splitting) and including a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3 or may include a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

Figure 3:
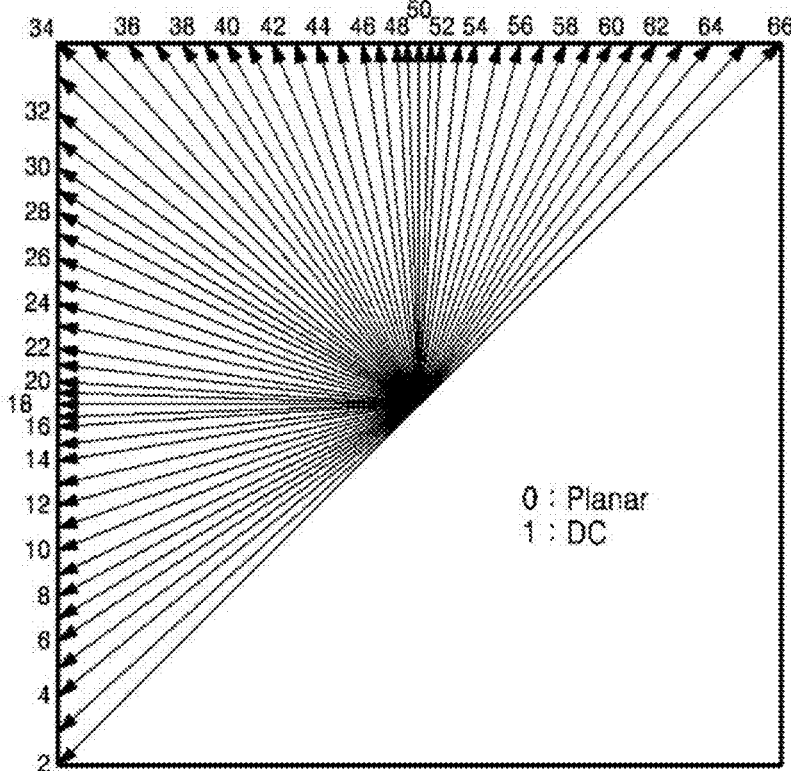
FIG. 3 shows a plurality of intra-prediction modes.

The intra-prediction unit 122 predicts samples in the current block using samples (reference samples) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring samples and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes and may select an intra-prediction mode that has the best rate distortion characteristics among the tested modes.

The intra-predictor 122 selects one intra-prediction mode from among the plurality of intra-prediction modes and predicts the current block using neighboring pixels (reference pixel) and an equation determined according to the selected intra-prediction mode. Information about the selected intra-prediction mode is encoded by the entropy encoder 155 and transmitted to the video decoding apparatus.

The inter-predictor 124 generates a prediction block for the current block through a motion compensation. The inter-predictor 124 searches for a block most similar to the current block in a reference picture, which has been encoded and decoded earlier than the current picture. The inter-predictor 124 generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The inter-predictor 124 may perform interpolation on a reference picture or a reference block in order to increase prediction accuracy. In other words, subsamples between two consecutive integer samples are interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit. The precision or resolution of the motion vector may be set differently for each target region to be encoded, for example, each unit such as a slice, tile, CTU, or CU. When such an adaptive motion vector resolution is applied, information about motion vector resolution to be applied to each target region should be signaled for each target region. For example, when the target region is a CU, information about the motion vector resolution applied to each CU is signaled.

The inter-predictor 124 may perform inter-prediction using bi-prediction. In bi-directional prediction, the inter-predictor 124 uses two reference pictures and two motion vectors representing block positions most similar to the current block in the respective reference pictures. The inter-predictor 124 selects a first reference picture and a second reference picture from reference picture list 0 (RefPicList0) and reference picture list 1 (RefPicList1), respectively, searches for blocks similar to the current block in the respective reference pictures and generates a first reference block and a second reference block. Then, it generates a prediction block for the current block by averaging or weighting the first reference block and the second reference block. Then, it transfers motion information including information about the two reference pictures and the two motion vectors used to predict the current block to the encoder 150. Here, RefPicList0 may be composed of pictures preceding the current picture in display order among the reconstructed pictures, and RefPicList1 may be composed of pictures following the current picture in display order among the reconstructed pictures. However, embodiments are not limited thereto. Pre-reconstructed pictures following the current picture in display order may be further included in RefPicList0. Conversely, pre-reconstructed pictures preceding the current picture may be further included in RefPicList1.

Motion information for used in inter-prediction (motion vector, reference picture) should be signaled to the video decoding apparatus. Various methods may be used to minimize the number of bits required to encode the motion information.

For example, when the reference picture and motion vector of the current block are the same as the reference picture and motion vector of a neighboring block, the motion information about the current block may be transmitted to the decoding apparatus by encoding information for identifying the neighboring block. This method is called a "merge mode."

In the merge mode, the inter-predictor 124 selects a predetermined number of merge candidate blocks (hereinafter referred to as "merge candidates") from among the neighboring blocks of the current block.

Figure 4:
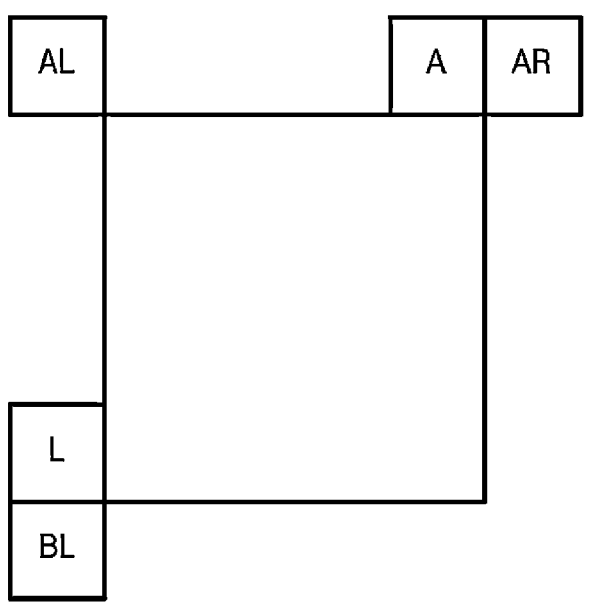
FIG. 4 shows neighboring blocks around a current block.

As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block, which is at the same position as the current block or blocks adjacent to the co-located block in the reference picture, may be additionally used as merge candidates.

The inter-predictor 124 configures a merge list including a predetermined number of merge candidates using such neighboring blocks. The inter-predictor 124 selects a merge candidate to be used as the motion information about the current block from among the merge candidates included in the merge list and generates merge index information for identifying the selected candidates. The generated merge index information is encoded by the encoder 155 and transmitted to the decoding apparatus.

Another method of encoding the motion information is an AMVP mode.

In the AMVP mode, the inter-predictor 124 derives predicted motion vector candidates for the motion vector of the current block by using neighboring blocks of the current block. All or part of the left block L, the above block A, the above right block AR, the bottom left block BL, and the above left block AL, which are adjacent to the current block in the current picture in FIG. 2, may be used as the neighboring blocks used to derive the predicted motion vector candidates. In addition, a block positioned within a reference picture (which may be the same as or different from the reference picture used to predict the current block) other than the current picture including the current block may be used as the neighboring blocks used to derive the predicted motion vector candidates. For example, a co-located block, which is at the same position as the current block or blocks adjacent to the co-located block in the reference picture, may be used.

The inter-predictor 124 derives predicted motion vector candidates using the motion vectors of the neighboring blocks and determines a predicted motion vector for the motion vector of the current block using the predicted motion vector candidates. Then, a motion vector difference is calculated by subtracting the predicted motion vector from the motion vector of the current block.

The predicted motion vector may be obtained by applying a predefined function (e.g., a function for calculating a median, an average, or the like) to the predicted motion vector candidates. In this case, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block are encoded.

The predicted motion vector may be determined by selecting any one of the predicted motion vector candidates. In this case, information for identifying the selected predicted motion vector candidate is further encoded along with the information about the motion vector difference and the information about the reference picture which are to be used to predict the current block.

The subtractor 130 subtracts the prediction block generated by the intra-predictor 122 or the inter-predictor 124 from the current block to generate a residual block.

The transformer 140 may transform residual signals within the residual block. A two-dimensional size of the residual block may be used as a transform unit (hereinafter, "TU"), which is a block size for performing transform. Alternatively, the residual block may be partitioned into a plurality of subblocks, and each subblock may be used as a TU to transform the residual signals within the corresponding subblock.

The transformer 140 may split the residual block into one or more subblocks and may apply the transformation to the one or more subblocks. Thus, the residual values of the transform blocks may be transformed from the sample domain to the frequency domain. In the frequency domain, the transformed blocks are referred to as coefficient blocks or transform blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may transform the residual block in the horizontal direction and the vertical direction individually. For transformation, various types of transform kernels or transform matrices may be used. For example, pairs of transform kernels for horizontal transformation and vertical transformation may be defined as a multiple transform set (MTS). The transformer 140 may select one pair of transform kernels having the best transformation efficiency in the MTS and transform the residual block in the horizontal and vertical directions, respectively. The information (mts_idx) on the transform function pair selected in the MTS is encoded by the entropy encoder 155 and signaled to the video decoding apparatus.

The quantizer 145 quantizes transform coefficients output from the transformer 140 using quantization parameters and outputs the quantized transform coefficients to the entropy encoder 155. For some blocks or frames, the quantizer 145 may directly quantize a related residual block without transformation. The quantizer 145 may apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may re-sort the coefficient values for the quantized residual value. The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan in which a two-dimensional array of coefficients is scanned in a column direction or a horizontal scan in which two-dimensional block-shaped coefficients are scanned in a row direction may be used instead of the zig-zag scan. In other words, a scan mode to be used may be determined among the zig-zag scan, the diagonal scan, the vertical scan, and the horizontal scan according to the size of the transformation unit and the intra-prediction mode.

The entropy encoder 155 encodes the one-dimensional quantized transform coefficients output from the rearrangement unit 150 using various encoding techniques, such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction. The entropy encoder 155 also encodes intra-prediction information (i.e., information about an intra-prediction mode) or inter-prediction information (a merge index for the merge mode, information about a reference picture index and a motion vector difference for the AMVP mode) according to the prediction type. The entropy encoder 155 also encodes information related to quantization, i.e., information about quantization parameters and information about a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The samples in the reconstructed current block are used as reference samples in performing intra-prediction of a next block.

The loop filter unit 180 filters the reconstructed samples to reduce blocking artifacts, ringing artifacts, and blurring artifacts generated due to block-based prediction and transformation/quantization. The loop filter unit 180 may include at least one of a deblocking filter 182, a sample adaptive offset (SAO) filter 184, or an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed sample and an original sample caused by lossy coding and performs filtering in a manner that adding a corresponding offset to each reconstructed sample. The ALF 186 performs filtering on a target sample to be filtered by applying filter coefficients to the target sample and neighboring samples of the target sample. The ALF 186 may divide the samples included in a picture into predetermined groups, and then determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 5:
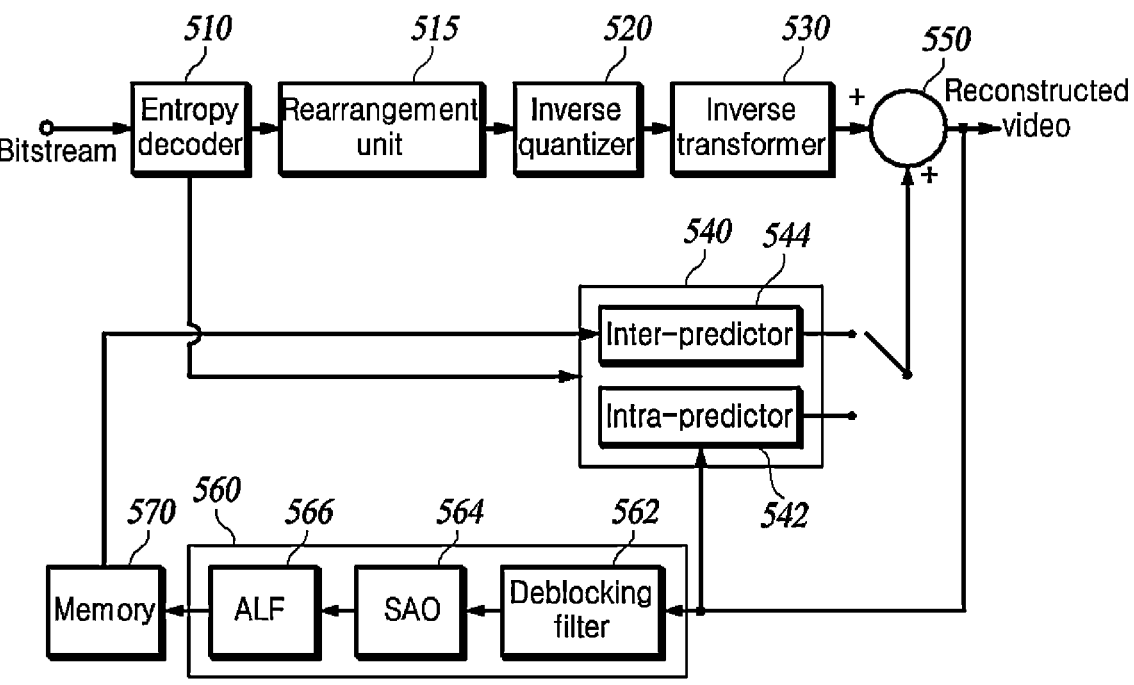
FIG. 5 is a block diagram of a video decoding apparatus capable of implementing the techniques of the present disclosure.

FIG. 5 is a functional block diagram of a video decoding apparatus capable of implementing the techniques of the present disclosure. Hereinafter, the video decoding apparatus and elements of the apparatus are described with reference to FIG. 5.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 510 determines a current block to be decoded by decoding a bitstream generated by the video encoding apparatus and extracting information related to block splitting and extracts prediction information and information about a residual signal, and the like required to reconstruct the current block.

The entropy decoder 510 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thus, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 510 extracts information about a prediction type indicating whether the current block is intra-predicted or inter-predicted. When the prediction type information indicates intra-prediction, the entropy decoder 510 extracts a syntax element for the intra-prediction information (intra-prediction mode) for the current block. When the prediction type information indicates inter-prediction, the entropy decoder 510 extracts a syntax element for the inter-prediction information, i.e., information indicating a motion vector and a reference picture referred to by the motion vector.

The entropy decoder 510 also extracts information about quantized transform coefficients of the current block as information related to quantization and information about residual signals.

The rearrangement unit 515 may change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 inversely quantizes the quantized transform coefficients using the quantization parameter. The inverse quantizer 520 may apply different quantization coefficients (scaling values) to the quantized transform coefficients arranged in two dimensions. The inverse quantizer 520 may perform inverse quantization by applying a matrix of quantization coefficients (scaling values) from the video encoding apparatus to a two-dimensional array of quantized transform coefficients.

The inverse transformer 530 inversely transforms the inversely quantized transform coefficients from the frequency domain to the spatial domain to reconstruct residual signals, thereby generating a reconstructed residual block for the current block. In addition, when the MTS is applied, the inverse transformer 530 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 540 may include an intra-predictor 542 and an inter-predictor 544. The intra-predictor 542 is activated when the prediction type of the current block is intra-prediction, and the inter-predictor 544 is activated when the prediction type of the current block is inter-prediction.

The intra-predictor 542 determines an intra-prediction mode of the current block among a plurality of intra-prediction modes based on the syntax element for the intra-prediction mode extracted from the entropy decoder 510 and predicts the current block using the reference samples around the current block according to the intra-prediction mode.

The inter-predictor 544 determines a motion vector of the current block and a reference picture referred to by the motion vector using the syntax element for the inter-prediction extracted from the entropy decoder 510 and predicts the current block based on the motion vector and the reference picture.

The inter-predictor 544 may perform interpolation filtering according to the value of the motion vector of the current block. In other words, if the decimal part of the motion vector is not 0, the inter-predictor 544 generates sub samples indicated by the decimal part through interpolation. If the decimal part of the horizontal component (x component) of the motion vector is not 0, interpolation is performed in a horizontal direction. If the decimal part of the vertical component (y component) of the motion vector is not 0, interpolation is performed in a vertical direction.

The adder 550 reconstructs the current block by adding the residual block output from the inverse transformer and the prediction block output from the inter-predictor or the intra-predictor. The samples in the reconstructed current block are used as reference samples in intra-predicting a block to be decoded next.

The loop filter unit 560 may include at least one of a deblocking filter 562, a SAO filter 564, or an ALF 566. The deblocking filter 562 deblocking-filters the boundary between the reconstructed blocks to remove blocking artifacts caused by block-by-block decoding. The SAO filter 564 performs filtering in a manner of adding the reconstructed block after deblocking filtering to corresponding offsets so as to compensate for a difference between the reconstructed sample and the original sample caused by lossy coding. The ALF 566 performs filtering on a target sample to be filtered by applying filter coefficients to the target sample and neighboring samples of the target sample. The ALF 566 may divide the samples in a picture into predetermined groups and then determine one filter to be applied to a corresponding group to differentially perform filtering on each group. The filter coefficient of the ALF is determined based on the information about the filter coefficient decoded from the bitstream.

The reconstructed block filtered through the loop filter unit 560 is stored in the memory 570. When all blocks in one picture are reconstructed, the reconstructed picture is used as a reference picture for inter-prediction of blocks in a picture to be encoded next.

As explained above, in the case of inter-prediction, the video encoding apparatus encodes information on a motion vector of the current block and on a reference picture the motion vector refers to and sends the information to the video decoding apparatus. The video decoding apparatus decodes the information received from the video encoding apparatus and determines the motion vector of the current block and the reference picture to be used for inter-prediction. Also, a prediction block is generated by using the determined motion vector and reference picture.

Generally, pictures constituting one video sequence have the same resolution or size. However, in some applications, the pictures, which belong to the one video sequence, may have different resolutions. When inter-predicting the current block, a picture encoded/decoded prior to the current picture including the current block within the video sequence is used as a reference picture. Accordingly, the current picture including the current block to be encoded or decoded may have a different resolution than the reference picture the current block refers to. In this case, the video encoding or decoding apparatus predicts the current block by using a reference picture having a different resolution than the current picture.

The present disclosure relates to an inter-prediction method for a video sequence of pictures some of which have different resolutions or sizes.

The video encoding apparatus encodes information (first syntax element) on a reference size of pictures constituting a video sequence and sends the information to the video decoding apparatus. The first syntax element includes a reference width and reference height of the pictures. The first syntax element may be included in a high-level syntax structure of a bitstream. For example, it may be included in an SPS, the sequence's header, and signaled to the video decoding apparatus. Alternatively, one or more picture groups constituting a sequence may have different reference sizes. In this case, the first syntax element may be included and signaled in a picture parameter set (PPS) that the pictures in the corresponding picture group commonly refer to.

Meanwhile, the actual size of the pictures constituting the video sequence may be different from the reference size. In other words, the pictures may have a size scaled from the reference size. The video encoding apparatus encodes a second syntax element for indicating the size (width and height) of the pictures scaled from the reference size. Since the pictures constituting the video sequence have different resolutions, the second syntax element may be configured differently for each picture group comprised of one or more pictures. Accordingly, the second syntax element may be included and signaled in a PPS. Pictures referring to different PPSs may have the second syntax elements set to different values.

In some embodiments, the second syntax element may be the actual width and height of the pictures. In some other embodiments, the second syntax element may be a value indicating the ratio with respect to the reference size. For example, the second syntax element may include a horizontal ratio indicating the difference with the reference width and a vertical ratio indicating the difference with the reference height. In some other embodiments, the second syntax element may be defined by offset values from the left, right, upper, and lower boundaries of a picture having the reference size.

The video encoding apparatus encodes input pictures. Additionally, if the size of the inputted pictures is different from the reference size, the video encoding apparatus may convert the resolution of the pictures so that the size of the inputted pictures is the same as the reference size. Resolution conversion may be performed in such a manner of enlarging the input pictures by padding samples with a predefined value. Alternatively, resolution conversion may involve upsampling or downsampling using a filter.

The video encoding apparatus and the video decoding apparatus may store in advance one or more filters used for resolution conversion. Or else, information on filters may be signaled for each sequence, picture, subpicture, slice, tile, CTU, etc.

Alternatively, n fixed default filters (n is a natural number greater than or equal to 1) and m additional filters (m is a natural number greater than or equal to 1) may be used, and information on the additional filters may be transmitted to the video decoding apparatus. When the information on the filters is signaled, the filter coefficient values per se may be signaled, or differences from default filter coefficients may be signaled. The video decoding apparatus may reconstruct filter coefficients from the differences.

If a plurality of filters are available, the index of a filter used for resolution conversion, among the plurality of filters, may be signaled. Alternatively, the video encoding apparatus and the video decoding apparatus may select a filter depending on a scale difference between the reference size and the actual size, without signaling of the index.

The video encoding apparatus performs inter-prediction using pictures whose resolutions are converted to the reference size. In other words, the video encoding apparatus determines a reference picture to be used for inter-prediction of the current block to be encoded and determines a motion vector indicating a position of a block in the reference picture that is the most similar to the current block. As explained below, if reference pictures are stored in their actual size, the reference pictures may have a different resolution than the current picture (having the actual size or reference size). Accordingly, the video encoding apparatus may convert the resolution of the reference picture so as to be the same as the resolution of the current picture and then determine the motion vector.

The video encoding apparatus generates a prediction block for the current block by using the reference picture and the motion vector. Information on the reference picture, information on the motion vector, and information on residual signals (differences between samples in the current block and the prediction block) are transmitted to the video decoding apparatus.

Meanwhile, the video encoding apparatus stores a picture reconstructed by the inverse quantizer 160, inverse transformer 165, adder 170, and filter 180 of FIG. 1 in the memory 190. Before storing it in the memory, the video encoding apparatus may convert the reconstructed picture to various resolutions or sizes and then store it. For example, the video encoding apparatus converts the reconstructed picture having the reference size into a picture having an actual size and then store the converted picture.

With reference to FIG. 6, hereinafter, a method is described that the video decoding apparatus decodes an encoded video sequence of pictures some of which have different resolutions or sizes.

The video decoding apparatus decodes a first syntax element indicating the reference size of pictures from the high-level syntax structure (e.g., SPS or PPS) of a bitstream. Also, it decodes a second syntax element indicating a picture size scaled from the reference size (S610). Moreover, if the current block to be decoded is inter-predicted, the video decoding apparatus decodes information on a motion vector and a reference picture of the current block and thereby determines the motion vector and the reference picture, which are related to the current block (S620).

The video decoding apparatus predicts the current block by using the reference picture and the motion vector. Since a picture decoded prior to the current picture, among the pictures belonging to the video sequence, is used as the reference picture, the reference picture indicated by the information on the reference picture may have a different size or resolution than the current picture where the current block is included. Like the video encoding apparatus, reference pictures stored in the memory of the video decoding apparatus may have the actual size by conversion, not the reference size. Meanwhile, the motion vector transmitted by the video encoding apparatus is a value determined according to the resolution of the current picture. Accordingly, prediction efficiency may be deteriorated if the decoded motion vector itself is applied to the reference picture.

As an embodiment for solving this problem, the video decoding apparatus may convert the resolution of the reference picture to the resolution of the current picture and then generate a prediction block from the resolution-converted reference picture, by using a decoded motion vector. At this time, as described above, the resolution conversion may be done by using a filter shared by the video encoding apparatus and the video decoding apparatus or a filter defined by filter information signaled from the video encoding apparatus.

In another embodiment, the decoded motion vector may be modified by using the first and second syntax elements. Such a modification process is used so as to modify a sample position indicated by the original motion vector in a reference picture having a different resolution than the current picture.

Referring to FIG. 6, the video decoding apparatus may calculate a scale factor indicating a scale difference between the current picture and the reference picture, by using the first syntax element for indicating the reference size and the second syntax element for indicating a picture size scaled from the reference size (S630).

For example, the video decoding apparatus may calculate a first value indicating a scale difference or scale ratio between the size of the reference picture and the reference size, by using a first syntax element indicating a reference size included in a PPS, which the reference picture refers to, and by using a second syntax element indicating a picture size scaled from the reference size. Also, the video decoding apparatus may calculate a second value indicating a scale difference or scale ratio between the size of the current picture and the reference size, by using a first syntax element indicating a reference size included in a PPS, which the current picture refers to, and by using a second syntax element indicating a picture size scaled from the reference size. Using the first value and the second value, the scale factor between the current picture and the reference picture is calculated.

Meanwhile, an offset factor for additionally modifying a motion vector may be calculated. Motion vectors may be expressed by a predefined fixed number of bits. Accordingly, a motion vector to which the scale factor is applied should be expressed by the same number of bits as the fixed number of bits. The offset factor may be used as a shift value, in a bit shift operation for adjusting the number of bits of the motion vector to which the scale factor is applied. The value of the motion vector is modified by the bit shift, and therefore a sample position indicated by the motion vector within the reference picture is modified. The offset factor for the bit shift is derived from the first and second syntax elements. For example, the value of the offset factor may be derived according to the value of the scale factor calculated by the first and second syntax elements.

Moreover, the offset factor may be used to adjust a position indicated by the motion vector. Actual pictures may have a different scale from a picture of a reference size and also have a different position within the picture of the reference size. The offset factor may be used to compensate for a position difference between the actual pictures within the reference picture. If the second syntax element is defined by offset values from the left, right, upper, and lower boundaries of a picture having the reference size, the offset factor may be set as offset values from the left and upper boundaries included in the second syntax element.

Meanwhile, the scale factor and the offset factor may be calculated for each of horizontal and vertical directions. A horizontal scale factor and a horizontal scale factor are applied to a horizontal component (x component) of the motion vector, and a vertical scale factor and a vertical offset factor may be applied to a vertical component (y component) of the motion vector.

The motion vector of the current block decoded from the bitstream is modified by the aforementioned scale factor and offset factor. In other words, a sample position indicated by the decoded motion vector within the reference picture is modified through the scale factor and the offset factor. The video decoding apparatus generates a prediction block having the same size as the current block from the modified sample position within the reference picture (S640).

Meanwhile, a motion compensation process for generating the prediction block from the reference picture stored in the memory may involve filtering. The filtering may be filtering for interpolation of the reference picture. The decimal part of the motion vector (modified motion vector) indicates the position of a sub sample, i.e., fractional sample. A sample value corresponding to the subsample position may be generated through interpolation from integer samples within the reference picture.

One or more filters are variously defined according to filter shapes, sizes (number of taps), and filter coefficients. One of these filters may be selected by the subsample position indicated by the motion vector, the difference (i.e., the aforementioned scale factor) in resolution or size between the current picture and the reference picture, a color component (luma or chroma) to be decoded, and so on.

Figure 7:
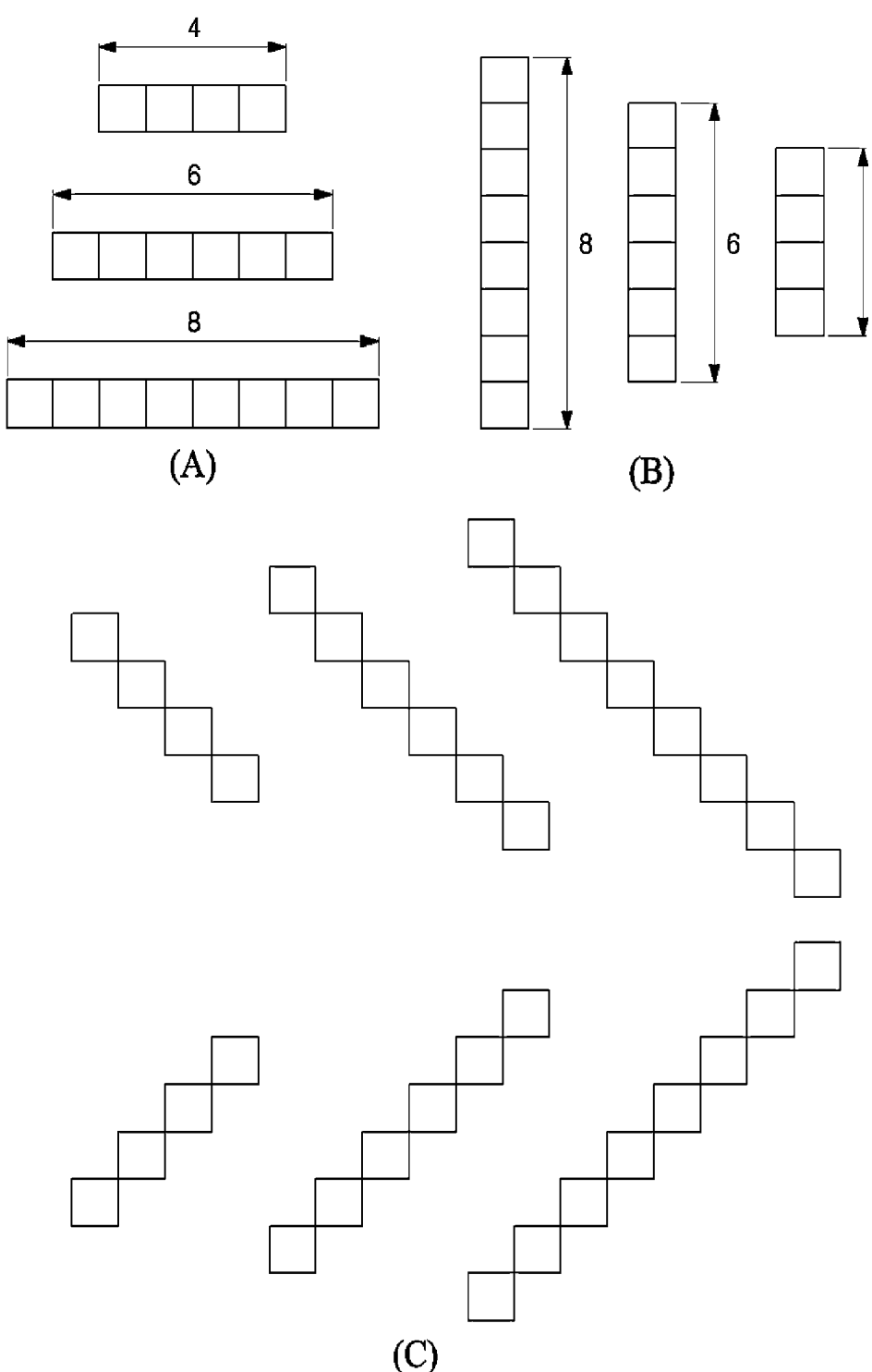
FIG. 7 is an illustration of one-dimensional filters that can be used for motion compensation.

In the motion compensation process, a one-dimensional filter for filtering a reference picture may be used. FIG. 7 is an illustration of one-dimensional horizontal, vertical, and diagonal filters. The filters may have a filter size of n such as 4, 6, 8, etc. The horizontal, vertical, and diagonal filters may be of the same size or different sizes.

Figure 8:
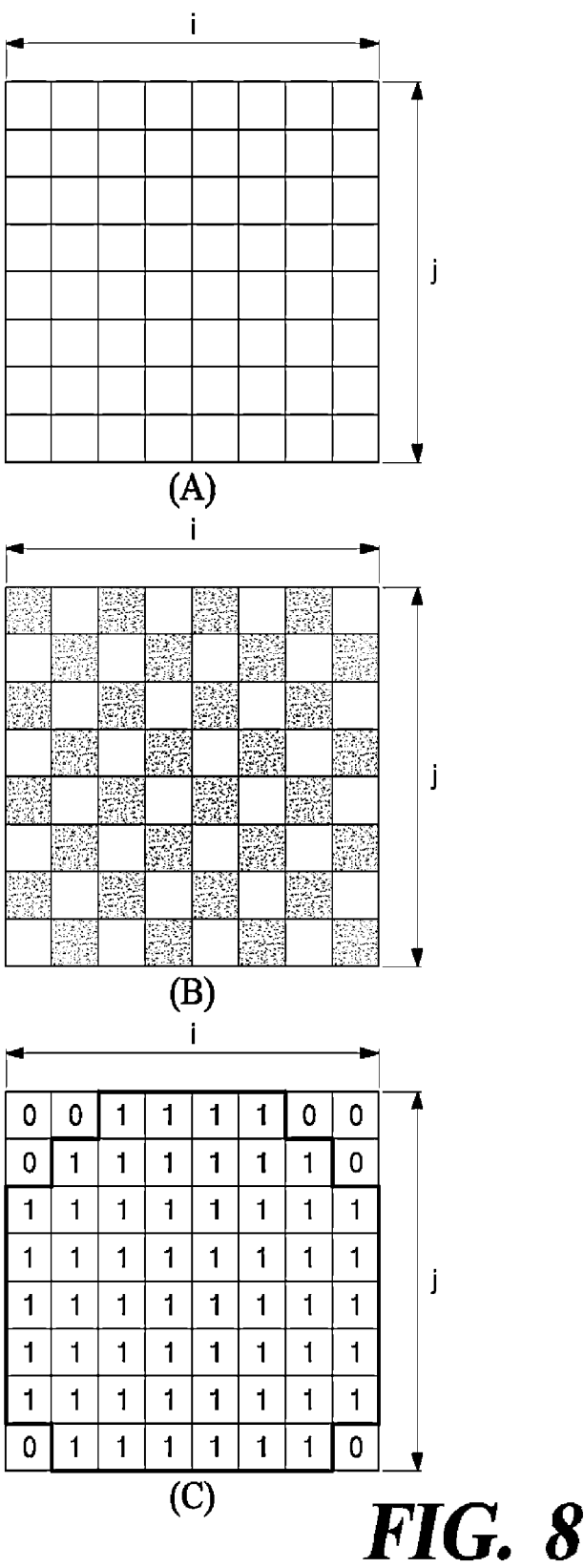
FIG. 8 is an illustration of two-dimensional filters that can be used for motion compensation.

Alternatively or additionally, a two-dimensional filter for filtering a reference picture may be used. FIG. 8 is an illustration of two-dimensional filters. As shown in (A) of FIG. 8, a general filter of i×j may be used. Alternatively, as shown in (B) of FIG. 8, a filter of a predetermined pattern may be used between the video encoding apparatus and the video decoding apparatus. Alternatively, as shown in (C) of FIG. 8, the video encoding apparatus may encode a two-dimensional mask including 0 and 1 and transmit it to the video decoding apparatus. The video decoding apparatus may decode the mask and determine the type of the two-dimensional filter.

The size of a filter to be used may be transmitted from the video encoding apparatus to the video decoding apparatus. Alternatively, the video encoding apparatus and the video decoding apparatus may use a predetermined filter size.

When various sizes of filters are used, the video encoding apparatus and the video decoding apparatus may determine the filter size according to the difference in resolution (or size) between the current picture and the reference picture. The size of a horizontal filter may be determined by a horizontal scale factor between the current picture and the reference picture, and the size of a vertical filter may be determined by a vertical scale factor.

Also, the filter size may be determined according to a color component, a profile or level, the position of a sub-picture, a layer id, a picture or slice type (I, P, B), the position indicated by the motion vector of the current block, a quantization parameter, etc.

Figure 9:
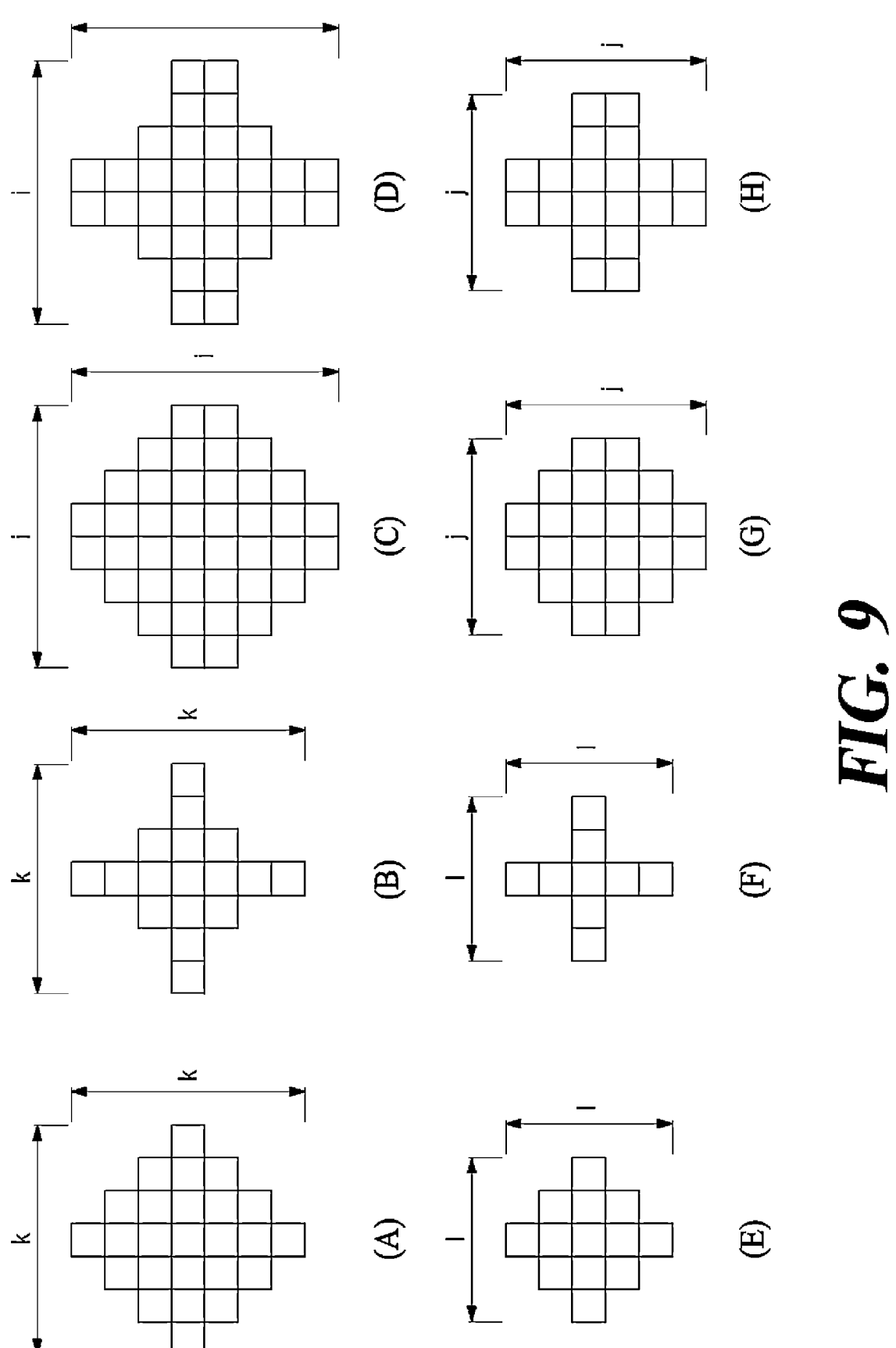

Meanwhile, a Wiener filter may be used as the two-dimensional filter. FIG. 9 illustrates the shapes and sizes of various Wiener filters. The shapes and sizes of Wiener filters to be used may be selected according to the characteristics of the reference picture or may be selectively used according to the luminance or chrominance components. Alternatively, the video encoding apparatus and the video decoding apparatus may store a plurality of Wiener filters in a likewise manner, and the video encoding apparatus may signal the index of a filter to be used among the plurality of Wiener filters to the video decoding apparatus.

Alternatively or additionally, as shown in FIG. 10, a Wiener filter whose horizontal and vertical lengths are different may be used. One of the multiple Wiener filters may be selected by the horizontal scale factor and vertical scale factor between the current picture and the reference picture. FIG. 10 only illustrates filters used in the case that the horizontal scale factor is greater than the vertical scale factor. In the case that the vertical scale factor is greater than the horizontal scale factor, the filters may be rotated at 90 degrees. Moreover, as shown in (M) and (N) of FIG. 10, a filter applied only to one direction may be used according to a horizontal or vertical scale ratio.

Meanwhile, in relation to the filter shape, a plurality of filters may be selectively used according to the characteristics of the reference picture.

In one embodiment, the video encoding apparatus may transmit information on classes and the number of classes according to the characteristics of the reference picture to the video decoding apparatus. Like the video encoding apparatus, the video decoding apparatus may determine a class by deriving the characteristics of the reference picture and select a filter corresponding to the determined class. If a plurality of filters are defined for the corresponding class, information on the filter index may be additionally transmitted.

The characteristics of the reference picture may be extracted for each block or pixel. When extracted for each block, the characteristics may be extracted using the entire samples in that block or may be extracted by partial sampling. A two-dimensional filter used generally may be used to extract the characteristics of the reference picture. For example, a filter for first differentiation or secondary differentiation may be used. The extracted characteristics may be calculated as a first characteristic and a second characteristic, and the two values may be quantized through predetermined values. A class may be selected through the quantized values. The first characteristics may be the sum of the absolute value of a horizontal secondary differential value and the absolute value of a vertical secondary differential value. The second characteristic may be an index value for either the horizontal, vertical, or diagonal direction in which the secondary differential value is the largest.

Alternatively, if ALF (Adaptive Loop Filter) is applied to the reference picture, a filter to be used for motion compensation may be selected by using a characteristic extracted in advance at an ALF process for a block corresponding to a reference position selected within the reference picture by the motion vector. The reference position may be a position shifted from the center or top right of the current block by the motion vector.

Meanwhile, in relation to filter coefficients, the video encoding apparatus and the video decoding apparatus may store in advance a plurality of filter coefficient sets each including a plurality of predefined filter coefficients. A filter coefficient set to be used among the plurality of filter coefficient sets may be adaptively selected according to the difference in resolution (or size) between the current picture and the reference picture. A filter coefficient set to be used for horizontal filtering may be determined by a horizontal scale factor between the current picture and the reference picture, and a filter coefficient set to be used for vertical filtering may be determined by a vertical scale factor between the current picture and the reference picture.

Alternatively or additionally, a filter coefficient set may be determined according to the position of a subpixel indicated by the motion vector for each of horizontal and vertical directions and the precision (resolution) of the motion vector. Also, different filter coefficients may be used for the luminance component and the color difference component.

In another embodiment, the filter coefficients may be signaled from the video encoding apparatus to the video decoding apparatus.

For example, the video encoding apparatus calculates the values of filter coefficients for minimizing error for each class classified according to the characteristics of the picture by using sample values of the current picture and the reference picture. For calculating the values of filter coefficients for minimizing error, a Least Square Method or auto-correlation and cross-correlation may be used. The filer coefficients generated for each class are signaled to the video decoding apparatus. Information on the filter coefficients may be included in a high-level syntax structure such as a SPS, a PPS, a slice header, and an APS. The video decoding apparatus reconstructs the filter coefficients generated for each class. Then, the video decoding apparatus determines a class by using the characteristics of the reference picture and thereby selects a filter coefficients corresponding to the determined class.

The filter coefficients may be predictively encoded. For example, the video encoding apparatus determines filter coefficients corresponding to the current high-level syntax structure and encodes, into the current high-level syntax structure, the differentials between the determined filter coefficients and the filter coefficients corresponding to the previous high-level syntax structure. The video decoding apparatus decodes filter coefficients included in the current high-level syntax structure and reconstructs final filter coefficients by adding the decoded filter coefficients to the filter coefficients reconstructed from the previous high-level syntax structure.

Figure 11:
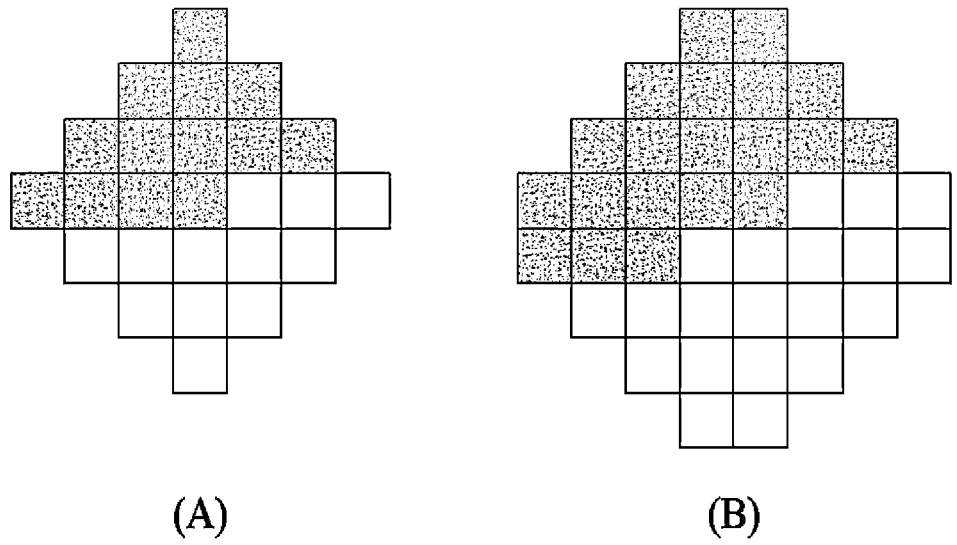
FIG. 11 is an illustration of signaling only some of filter coefficients.

Meanwhile, as shown in FIG. 11, only some of the filter coefficients may be transmitted, and the rest may be derived according to the characteristics of the reference picture. The positions of the filter coefficients signaled in FIG. 11 are shaded. Some filter coefficients use fixed values or previously reconstructed filter coefficients, and only the remaining filter coefficients to be updated may be signaled.

It should be understood that the above-described embodiments can be implemented in many different ways. The functions described in one or more examples may be implemented in hardware, software, firmware, or any combination of the above. The functional components described in this specification have been labeled as units in order to more particularly emphasize their implementation independence.

Meanwhile, various methods or functions described in the present disclosure may be implemented with instructions stored in a non-transitory recording medium, which may be read and executed by one or more processors. The non-transitory recording medium includes, for example, all types of recording devices in which data is stored in a form readable by a computer system. For example, the non-transitory recording medium includes storage media such as an erasable and programmable read only memory (EPROM), an electrically erasable and programmable read-only memory (EEPROM), a flash drive, an optical drive, a magnetic hard drive, and a solid state drive (SSD).

Although embodiments have been described for illustrative purposes, those having ordinary skill in the art should appreciate that various modifications and changes are possible, without departing from the idea and scope of the embodiments. Embodiments have been described for the sake of brevity and clarity. Accordingly, one of ordinary skill should understand that the scope of the embodiments is not limited by the embodiments explicitly described above but includes the claims and equivalents thereto.

What is claimed is:

1. A method for decoding a sequence of pictures, some of which have different resolutions, the method comprising:

decoding, from a high-level syntax structure of a bitstream, a first syntax element for specifying a reference size of pictures referring to the high-level syntax structure and a second syntax element for specifying a picture size scaled from the reference size of the pictures referring to the high-level syntax structure;

deriving, based on the first syntax element and the second syntax element, at least one offset factor and at least one scale factor representing a scale difference between a current picture including a current block to be decoded and a reference picture referred to by the current block;

generating a prediction block of the current block from the reference picture by using the motion vector of the current block, the at least one scale factor, and the at least one offset factor;

reconstructing a residual block from the bitstream; and reconstructing the current block based on adding the prediction block and the residual block, wherein the at least one scale factor and the at least one offset factor are used to modify a sample position indicated by a motion vector of the current block within the reference picture, wherein the at least one scale factor includes a horizontal scale factor and a vertical scale factor that are respectively applied to horizontal and vertical components of the motion vector of the current block, and wherein the at least one offset factor includes a horizontal offset factor and a vertical offset factor that are respectively applied to horizontal and vertical components of the motion vector of the current block.

2. The method of claim 1, wherein the high-level syntax structure is a picture parameter set respectively defined for picture groups, wherein each of the picture groups includes one or more pictures among the pictures included in the sequence, and wherein the picture parameter set contains parameters commonly referred to by the pictures within a corresponding picture group.

3. The method of claim 1, wherein generating the prediction block of the current block comprises:

generating a modified motion vector by applying the at least one scale factor and the at least one offset factor to the motion vector of the current block; and generating the prediction block by using reconstructed samples at a position indicated by the modified motion vector within the reference picture.

4. The method of claim 1, wherein the prediction block is generated by filtering the reference picture, and wherein a filter used for the filtering is adaptively selected from among a plurality of filters according to the at least one scale factor.

5. The method of claim 4, wherein the filtering comprises horizontal filtering and vertical filtering, wherein a filter for the horizontal filtering is adaptively determined according to the horizontal scale factor, and wherein a filter for the vertical filtering is adaptively determined according to the vertical scale factor.

6. The method of claim 1, wherein the second syntax element is defined by offset values from left, upper, right, and lower boundaries of a picture having the reference size.

7. A method for encoding a sequence of pictures, some of which have different resolutions, the method comprising:

encoding, into a high-level syntax structure of a bitstream, a first syntax element for specifying a reference size of pictures referring to the high-level syntax structure and a second syntax element for specifying a picture size scaled from the reference size of the pictures referring to the high-level syntax structure, wherein the first syntax element and the second syntax element are encoded for use in deriving at least one offset factor and at least one scale factor representing a scale difference between a current picture including a current block to be decoded and a reference picture referred to by the current block, and wherein the at least one scale factor and the at least one offset factor are used to modify a sample position indicated by a motion vector of the current block within the reference picture;

generating a prediction block of the current block from the reference picture by using the motion vector of the current block, the at least one scale factor, and the at least one offset factor;

generating a residual block of the current block based on the prediction block; and encoding information on the residual block, wherein the at least one scale factor includes a horizontal scale factor and a vertical scale factor that are respectively applied to horizontal and vertical components of the motion vector of the current block, and wherein the at least one offset factor includes a horizontal offset factor and a vertical offset factor that are respectively applied to horizontal and vertical components of the motion vector of the current block.

8. A method for transmitting a bitstream containing encoded video data, the method comprising:

generating the bitstream by encoding a sequence of pictures some of which have different resolutions; and transmitting the bitstream to a video decoding apparatus, wherein generating the bitstream includes (i) encoding, into a high-level syntax structure of the bitstream, a first syntax element for specifying a reference size of pictures referring to the high-level syntax structure and a second syntax element for specifying a picture size scaled from the reference size of the pictures referring to the high-level syntax structure, wherein the first syntax element and the second syntax element are encoded for use in deriving at least one offset factor and at least one scale factor representing a scale difference between a current picture including a current block to be decoded and a reference picture referred to by the current block, and wherein the at least one scale factor and the at least one offset factor are used to modify a sample position indicated by a motion vector of the current block within the reference picture, (ii) generating a prediction block of the current block from the reference picture by using the motion vector of the current block, the at least one scale factor, and the at least one offset factor, (iii) generating a residual block of the current block based on the prediction block, and (iv) encoding information on the residual block, wherein the at least one scale factor includes a horizontal scale factor and a vertical scale factor that are respectively applied to horizontal and vertical components of the motion vector of the current block, and wherein the at least one offset factor includes a horizontal offset factor and a vertical offset factor that are respectively applied to horizontal and vertical components of the motion vector of the current block.

* * * * *